(12) United States Patent
Chen et al.

(10) Patent No.: US 10,586,152 B2
(45) Date of Patent: Mar. 10, 2020

(54) DETERMINING IMAGE FORENSICS USING GRADIENT STATISTICS AT EDGES

(71) Applicant: Honeywell International Inc., Morris Plains, NJ (US)

(72) Inventors: Can Chen, Newark, DE (US); Scott McCloskey, Minneapolis, MN (US)

(73) Assignee: Honeywell International Inc., Morris Plains, NJ (US)

( * ) Notice: Subject to any disclaimer, the term of this patent is extended or adjusted under 35 U.S.C. 154(b) by 208 days.

(21) Appl. No.: 15/435,066

(22) Filed: Feb. 16, 2017

(65) Prior Publication Data

US 2018/0232605 A1    Aug. 16, 2018

(51) Int. Cl.
| | | |
|---|---|---|
| G06K 9/00 | (2006.01) |
| G06N 3/08 | (2006.01) |
| G06K 9/46 | (2006.01) |
| G06N 20/10 | (2019.01) |
| G06N 3/04 | (2006.01) |
| G06K 9/62 | (2006.01) |

(52) U.S. Cl.
CPC .............. *G06N 3/08* (2013.01); *G06K 9/4604* (2013.01); *G06K 9/4642* (2013.01); *G06N 3/0454* (2013.01); *G06N 20/10* (2019.01); *G06K 9/6269* (2013.01)

(58) Field of Classification Search
None
See application file for complete search history.

(56) References Cited

U.S. PATENT DOCUMENTS

| | | | | |
|---|---|---|---|---|
| 7,505,606 | B2 * | 3/2009 | Lin .......................... | G06K 9/00 382/100 |
| 7,539,331 | B2 | 5/2009 | Wendt et al. | |
| 2013/0308858 | A1 | 11/2013 | Xu et al. | |
| 2014/0376812 | A1 | 12/2014 | Kawazu | |
| 2018/0034852 | A1 * | 2/2018 | Goldenberg ............ | G06F 21/32 |

OTHER PUBLICATIONS

Farid, Hany, "Image Forgery Detection—A Survey", *IEEE Signal Processing Magazine*, (Mar. 2009), 16-25.

Hsu, Yu-Feng, et al., "Camera Response Functions for Image Forensics: An Automatic Algorithm for Splicing Detection", *IEEE Transactions on Information Forensics and Security*, 5(4), (Dec. 2010), 816-825.

Hsu, Yu-Feng, et al., "Detecting Image Splicing Using Geometry Invariants and Camera Characteristics Consistency", *2006 IEEE International Conference on Multimedia and Expo*, (Jul. 2006), 549-552.

(Continued)

*Primary Examiner* — Fred H Hu
(74) *Attorney, Agent, or Firm* — Schwegman Lundberg & Woessner, P.A (57) ABSTRACT

A system assesses the integrity of a digital image by detecting an edge in the digital image and defining a patch of pixels encompassing the edge. The system then generates data relating to intensity and gradient magnitude for pixels in the patch, analyzes the data relating to intensity and gradient magnitude, and determines that the digital image has been forged or the digital image has not been forged based on the analysis of the data relating to intensity and gradient magnitude.

15 Claims, 6 Drawing Sheets

(56) References Cited

OTHER PUBLICATIONS

Hsu, Yu-Feng, et al., "Image Splicing Detection Using Camera Response Function Consistency and Automatic Segmentation", *ICME*, (2007), 28-31.

Hsu, Yu-Feng, et al., "Statistical Fusion of Multiple Cues for Image Tampering Detection", *2008 42nd Asilomar Conference on Signals, Systems and Computers*, (Oct. 2008), 5 pgs.

Lin, Zhouchen, et al., "Detecting Doctored Images Using Camera Response Normality and Consistency", *2005 IEEE Computer Society Conference on Computer Vision and Pattern Recognition (CVPR'05)*, (2005), 6 pgs.

* cited by examiner

DETERMINING IMAGE FORENSICS USING GRADIENT STATISTICS AT EDGES

GOVERNMENT INTEREST

This invention was made with Government support under Contract FA8750-16-C-0190 awarded by the Air Force. The Government has certain rights in this invention.

TECHNICAL FIELD

The present disclosure relates to determining image forensics using gradient statistics at edges in an image.

BACKGROUND

Determining the integrity of digital media is of increasing importance due to the proliferation of both real and forged imagery on social media platforms. It is easier than ever to use manipulation programs (e.g., Photoshop®) to alter the content of an image in order to misinform the public or to commit fraud. As such, there is a need for methods to assess the integrity of imagery in both the commercial and government sectors. These methods must work with uncontrolled source imagery and produce, with as little user input as possible, a numerical assessment of the probability that the image or video has been altered in such a way as to misinform or mislead the recipient.

In the government sector, a number of agencies employ image analysts who can be more productive in their work of enemy force assessment, counter-intelligence, and debunking misinformation from foreign intelligence services.

In the commercial realm, the ubiquity of digital cameras in mobile phones and other devices has made the assessment of integrity increasingly important. Insurance adjusters have traditionally been a user of prior art digital image integrity assessment in order to assess whether images of a car before or after an accident have been altered to exaggerate or understate damage. Other industries such as the parcel delivery industry have exhibited an interest in the use of digital imagery to document the condition of a parcel when it comes into their custody, and have similar concerns about the veracity of customer-provided imagery.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, electrical, and optical changes may be made without departing from the scope of the present invention. The following description of example embodiments is, therefore, not to be taken in a limited sense, and the scope of the present invention is defined by the appended claims.

A difference between embodiments disclosed herein and prior art is that estimating a Camera Response Function (CRF) is avoided. Instead of the CRF, embodiments use an intensity-gradient feature (IG) feature to detect the manipulated edges in a forged image after a copy and paste operation, which is known as splicing to those of skill in the art. An advantage of the IG feature over the CRF is that explicit CRF estimation is error-prone, and there are whole categories of images for which there is no applicable CRF estimation. Consequently, embodiments of the present disclosure have wider applicability than the prior art, and thus perform better.

Specifically, prior systems check the consistency of the camera response function (CRF) in each segment of an image for image forensics. However, the CRF estimation is not accurate enough. First, the CRF model used to facilitate an estimate is not generalized enough to cover all kinds of CRFs. Second, different imaging systems or cameras have very similar CRFs. Third, the estimation methods are not accurate because the range of pixel intensity values and noise of the image also affect the estimation accuracy. One or more embodiments have the ability to detect forgery edges that are difficult to detect or even undetectable using the CRF. For example, in the case wherein a copied object and the image into which the copied object is pasted are from the same camera, or from cameras with very similar CRFs, previous methods are not capable of distinguishing the copied object from the rest of the image.

Figure 1:
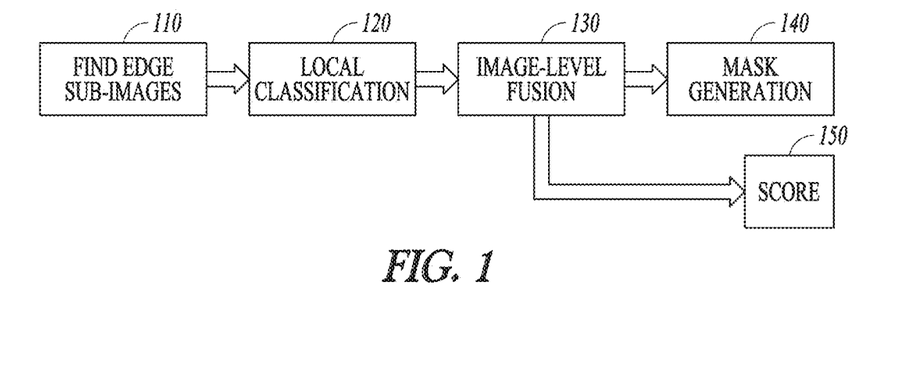
FIG. 1 is a block diagram illustrating a process to determine the integrity of an image using gradient statistics at an edge.
Figure 7:
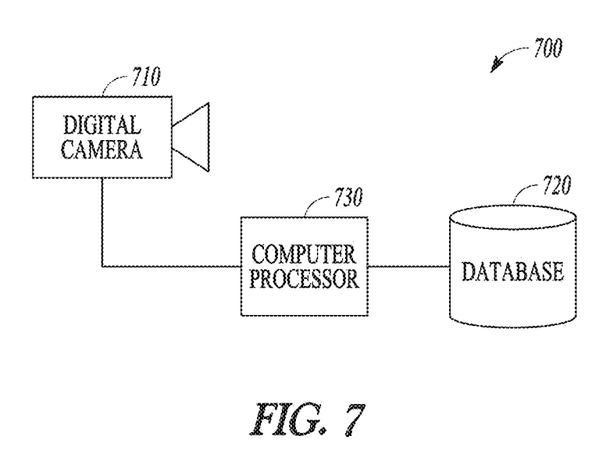
FIG. 7 is a block diagram illustrating a system including a digital camera, a computer processor, and a database.

As illustrated in FIG. 1, an embodiment includes operations of an edge sub-image extraction 110, a local classification 120, an image level fusion 130, and a mask generation 140. The system generates a score 150, and based on this score 150, it is determined whether an image has been forged or not. The score 150 indicates the probability that the image has either been forged or the probability that the image has not been forged. FIG. 7 is a block diagram illustrating a system 700 including a digital camera 710, a database 720, and a computer processor 730.

In the edge sub-image and IG feature extraction 110, for an input image, edge patches of a certain size. e.g., a size of 50×50 pixels are automatically detected. Normally, the size of a patch is between 30×30 pixels and 100×100 pixels. The patch size should be large enough to cover a full edge, including a constant flat region. While the edge can be any shape, the patch should cover only one edge, and include only two pixel intensities and the transition.

Figure 2:
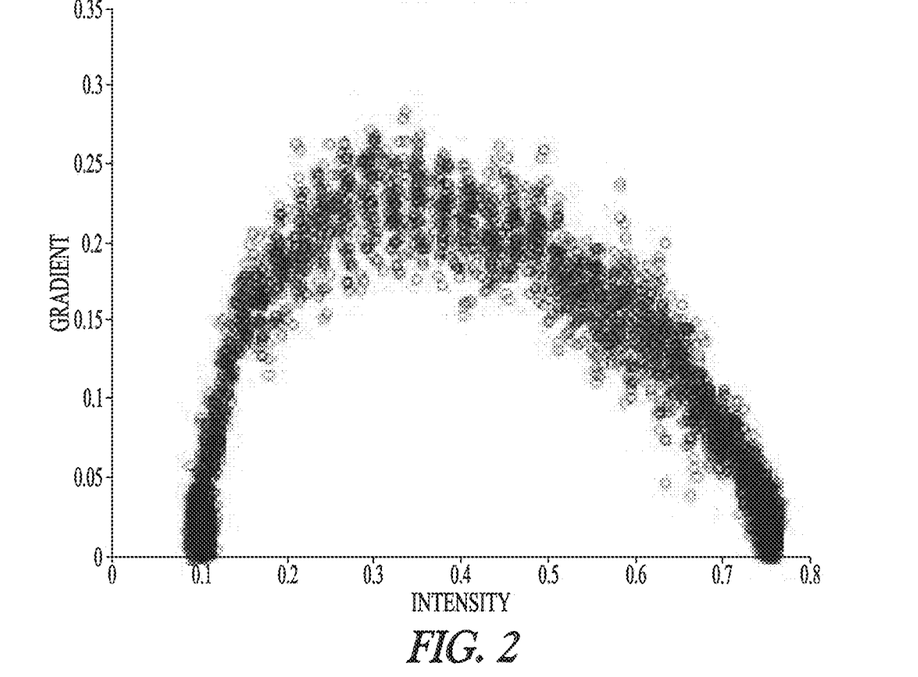
FIG. 2 illustrates a scatter plot of an authentic, non-forged image.
Figure 3:
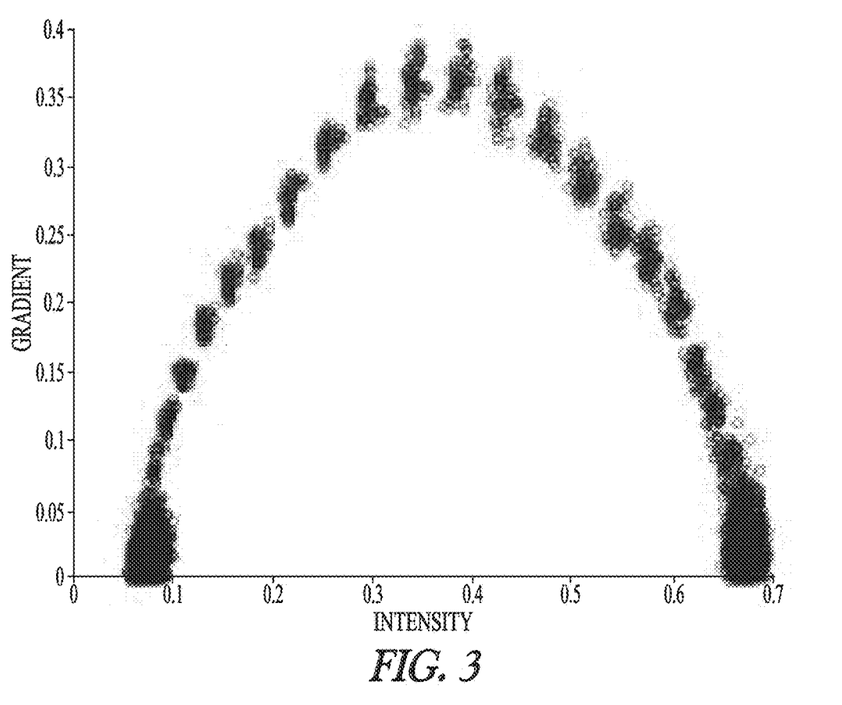
FIG. 3 illustrates a scatter plot of an inauthentic, forged image.
Figure 4:
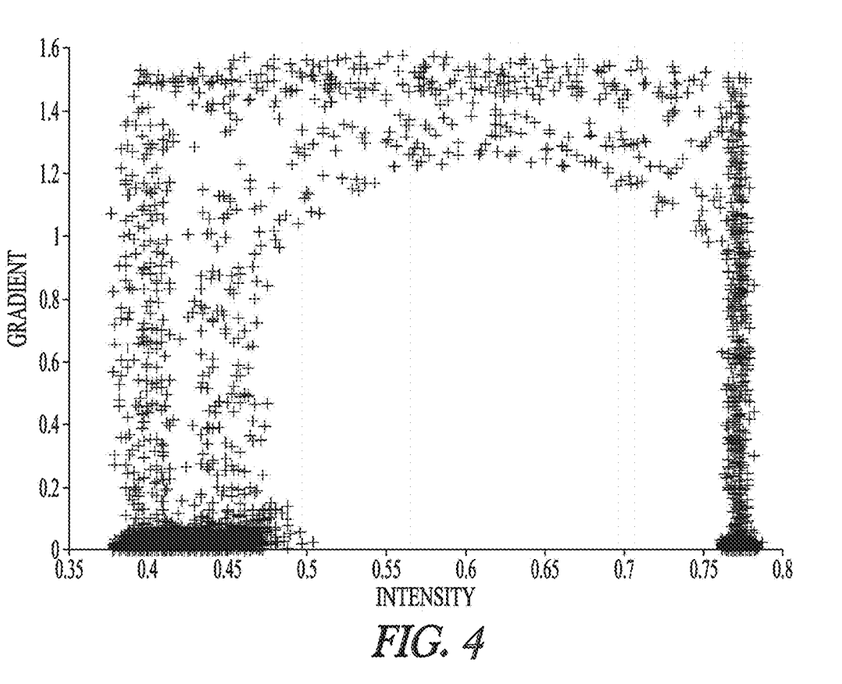
FIG. 4 illustrates a scatter plot of an inauthentic, forged image.
Figure 5:
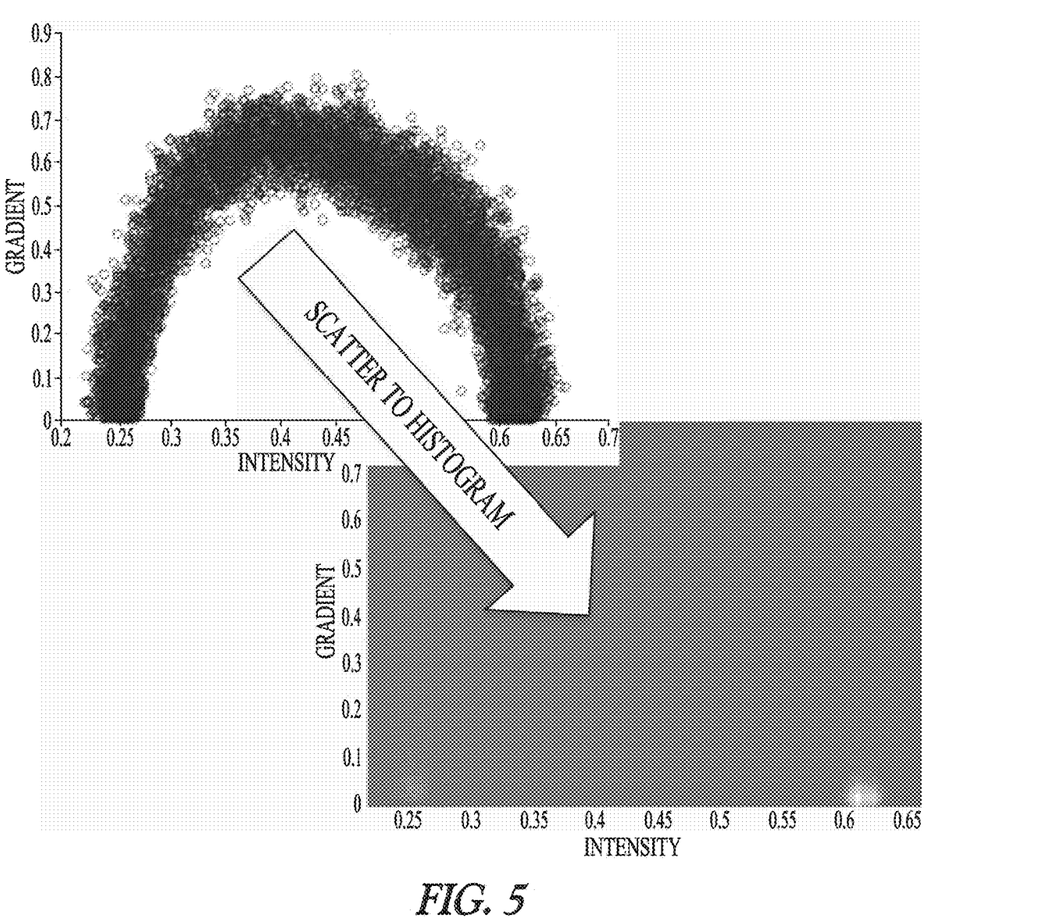
FIG. 5 illustrates a transformation of a scatter plot to a two-dimensional histogram.

A scatter plot or two-dimensional (2D) histogram of pixel intensity versus gradient magnitude is computed, that is, the IG feature. As illustrated in FIG. 2, the shape of the scatter plot or histogram of an authentic image is an asymmetric arch shape, due to the non-linearity of the CRF. In an authentic image, the low intensity to middle intensity transition and the middle intensity to high intensity transition have different gradients. If the edge is out-of-focus, the blurred edge IG feature will have a skewed asymmetric arch shape, due to the camera's application of a nonlinear CRF after optical blurring. As noted, the low intensity to middle intensity and middle intensity to high intensity have different gradients, and the CRF usually has a larger gradient in low intensity and smaller gradient in high intensity region. If the edge is blurred after a copy and paste operation, i.e. the forgery edge, its IG feature will have a symmetric arch shape as illustrated in FIG. 3 because the transition region of a sharp edge is very small, and the blur operation is performed after the CRF. If the edge is not blurred after a copy and paste operation, its IG feature will have a right angle shape as illustrated in FIG. 4.

A local classification operation 120 is performed by first collecting training data, and then using machine learning, such as a support vector machine (SVM), or some other simulation, to train a forgery detection model. A parametric fit could also be used. For any new input image, each edge patch is classified as either authentic or a forgery.

In an image level fusion operation 130, local classification results are accumulated over an image to finally classify the image as authentic or a forgery. As a simple example, if twenty patches are analyzed in an image, and it is determined that seventeen of those patches indicate forgery, then the fusion analysis may indicate that the image has been forged. If only three patches indicate a possible forgery, then it may be determined that the image has not been forged. A threshold can be established to determine whether an image has been forged or not, such as seventy percent or higher indicates forgery. The number of patches that indicate forgery can be referred to as the score 150.

In a mask generation operation 140, all forgery edge patches that are connected with or related to each other are assimilated to generate a mask that locates the copied object in the image.

Figure 6A:
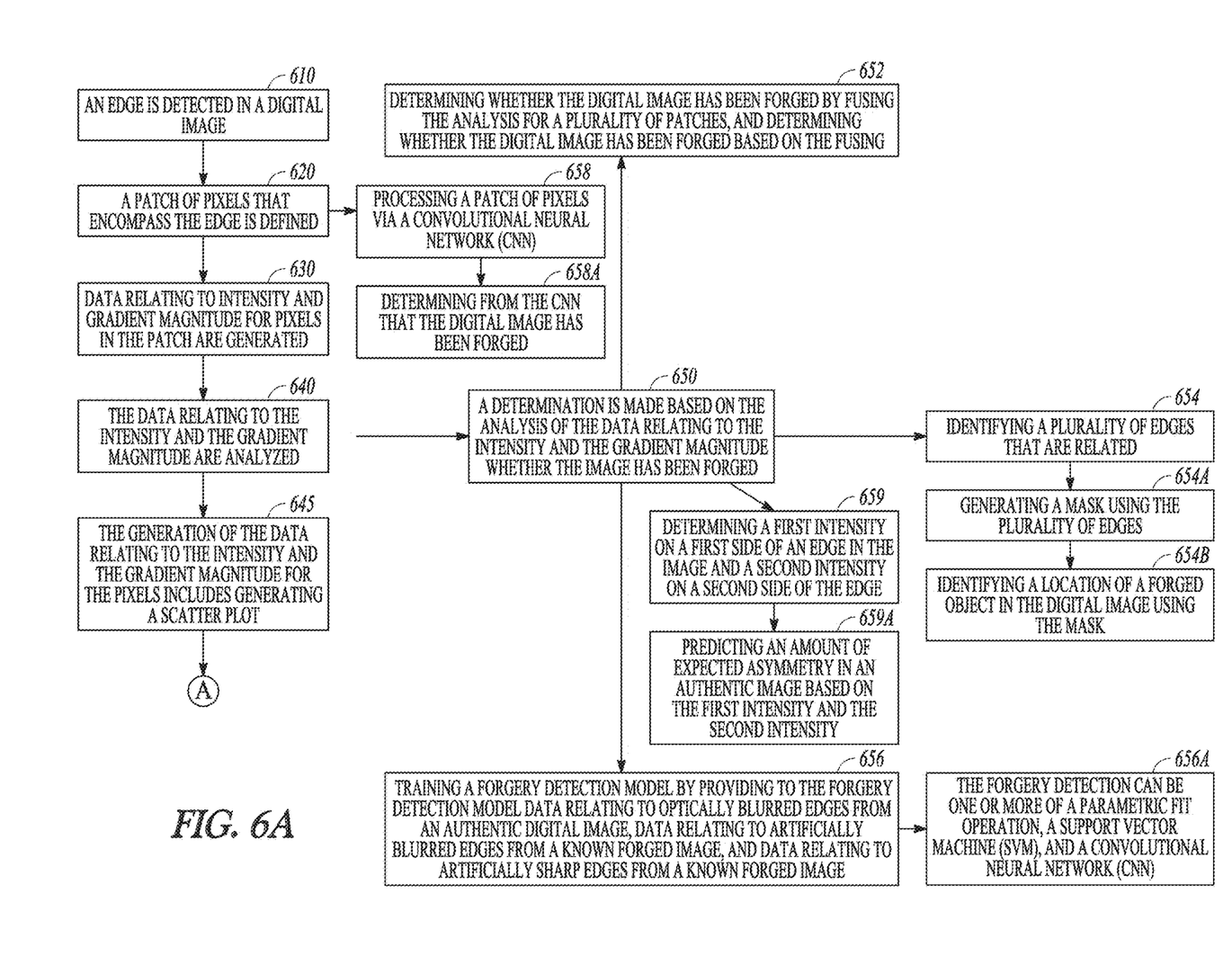
FIGS. 6A and 6B are a block diagram illustrating features and operations of a method and system for determining image forensics using gradient statistics at the edges in images.
Figure 6B:
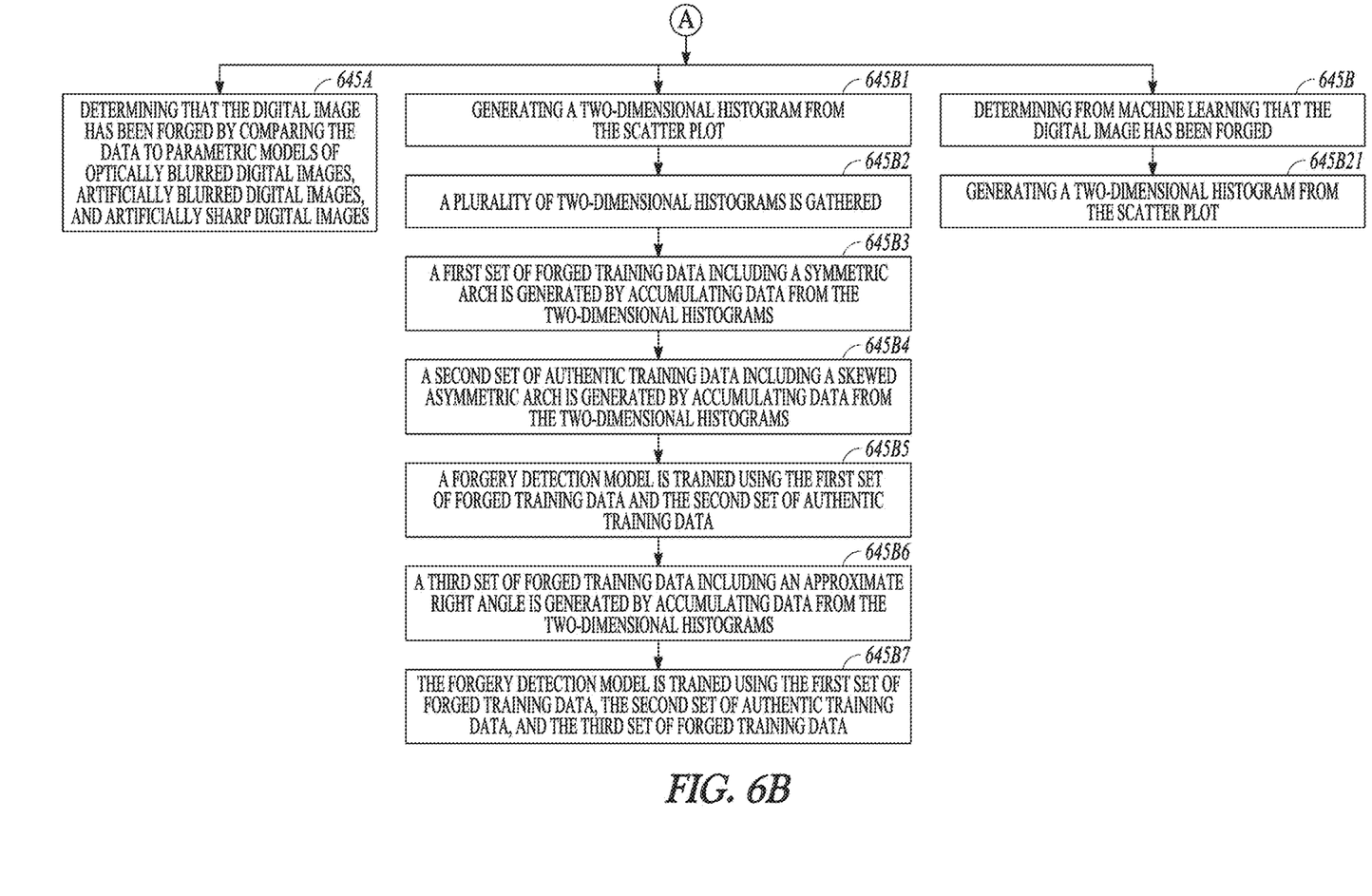

FIGS. 6A and 6B are a block diagram illustrating features and operations of a method for determining image forensics using gradient statistics at edges. FIGS. 6A and 6B include a number of process blocks 610-659A. Though arranged somewhat serially in the example of FIGS. 6A and 6B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIGS. 6A and 6B, at 610, an edge is detected in a digital image. As is known to those of skill in the art, such an edge is normally detected by differences in pixel intensity along each side of the edge. At 620, a patch of pixels that encompasses the edge is defined. It is this patch of pixels that is then further processed. In an embodiment, as indicated at 658, a patch of pixels is processed via a convolutional neural network (CNN), and as indicated at 658A, it is determined from the CNN that the digital image has been forged or the digital image has not been forged.

At 630, data relating to intensity and gradient magnitude for pixels in the patch are generated. The intensity and gradient magnitude of the pixels in the patch further assist in identifying the exact nature of the edge. At 640, the data relating to the intensity and the gradient magnitude are analyzed. The different methods and techniques for analyzing these intensity and gradient magnitude data are discussed in more detail below. Finally, at 650, a determination is made based on the analysis of the data relating to the intensity and the gradient magnitude whether the image has been forged or the image has not been forged.

At 645, the generation of the data relating to the intensity and the gradient magnitude for the pixels in the patch includes generating a scatter plot of the intensity versus the gradient magnitude for the pixels in the patch. Examples of such scatter plots are illustrated in FIGS. 2, 3, 4, and 5.

At 645B1, a two-dimensional histogram is generated from a scatter plot. The process of transforming the scatter plot into a two-dimensional histogram is graphically illustrated in FIG. 5. Also at 645B1, data from the two-dimensional histogram is processed via a support vector machine (SVM), and a determination is made from the SVM processing that the digital image has been forged or the digital image has not been forged.

At 645B3, a plurality of the two-dimensional histograms are gathered. At 645B4, a first set of forged training data is generated by accumulating data from the two-dimensional histograms. Such forged training data is a two-dimensional histogram that includes a symmetric arch, and that includes a gradient magnitude from low intensity to middle intensity and a gradient magnitude from middle intensity to high intensity that are substantially the same. At 645B5, a second set of authentic training data is generated by accumulating data from the two-dimensional histograms wherein the two-dimensional histograms include a skewed asymmetric arch, and wherein the gradient magnitude from low intensity to middle intensity and the gradient magnitude from middle intensity to high intensity are not substantially the same. At 645B6, a forgery detection model is trained using the first set of forged training data and the second set of authentic training data. At 645B7, a third set of forged training data is generated by accumulating data from the two-dimensional histograms wherein the two dimensional histograms include an approximate right angle. After the generation of the third set of forged training data, the forgery detection model is trained using the first set of forged training data, the second set of authentic training data, and the third set of forged training data.

At 645A, the analysis of the data and the determination that the digital image has been forged or the digital image has not been forged involves comparing the data to parametric models of optically blurred digital images, artificially blurred digital images, and artificially sharp digital images, and determining whether the digital image has been forged or has not been forged based on the comparison. The parametric models are generated from a plurality of scatter plots of intensity versus gradient magnitude values for known optically blurred images, artificially blurred images, and artificially sharp images. Thereafter, a plot of an image is compared to the parametric models to determine if the image plot is substantially similar to one of the optical blurred, artificially blurred, or artificially sharp models. If so, a determination can be made as to whether the image has been forged or not. Optical blurring is a normal result of a camera's camera response function (CRF), and an image that is optically blurred therefore is normally considered authentic or not forged (FIG. 2). Artificial blurring is the result of the blurring of an image by software such as Photoshop®, which alters an image by copying into the image a pixelated object (FIG. 3). The effects of artificial blurring occurs after the effects of the CRF of the camera. Artificially sharp images are the result of other types of software manipulations to an image that are applied after the image is created with the effects of the camera's CRF (FIG. 4).

At 645B, the analysis of the data and the determination that the digital image has been forged or the digital image has not been forged involves processing the data relating to pixel intensity and gradient magnitude via machine learning, and determining from the machine learning that the digital image has been forged or the digital image has not been forged.

At 652, the determination of whether the digital image has been forged or the digital image has not been forged involves fusing the analysis for a plurality of patches, and determining whether the digital image has been forged or the digital image has not been forged based on the fusing. Such fusion analysis can take on many forms, and as noted above, a simple means is to determine the percentage of patches that indicate that the image has been forged, and if that percentage is greater than a threshold, then the decision can be made that the image has been forged. A level of confidence can also be attached to such a decision.

At 654, a plurality of edges that are related are identified. One manner of determining that edges are related could be a determination that two edges contact or intersect each other, or determining that two edges are in very close proximity to each other (e.g., by two or three pixels) and that such pixels have a substantially similar intensity value. At 654A, a mask is generated using the plurality of edges, and at 654B, a location of a forged object in the digital image is identified using the mask. Therefore, not only can the determination be made of whether the image has been forged or not, but the location and shape of the forged object can be determined.

In another embodiment, as indicated at 656, a forgery detection model is trained by providing to the forgery detection model data relating to optically blurred edges from an authentic digital image, data relating to artificially blurred edges from a known forged image, and data relating to artificially sharp edges from a known forged image. As noted at 656A, the forgery detection can be one or more of a parametric fit operation, a support vector machine (SVM), and a convolutional neural network (CNN). The training is a multi-dimensional training scheme that includes comparing optically blurred edges to artificially blurred edges and artificially sharp edges, comparing artificially blurred edges to optically blurred edges and artificially sharp edges, and comparing artificially sharp edges to optically blurred edges and artificially blurred edges. From these three sets of comparisons, a more confident decision can be made as to the authenticity of the image.

In yet another embodiment, at 659, a first intensity on a first side of an edge in the image is determined, and a second intensity on a second side of the edge of the image is determined. Then, at 659A, an amount of expected asymmetry in an authentic image is predicted based on the first intensity and the second intensity. This feature can be used to assist in determining whether the image has been forged or not. If the first and second intensities are above a threshold, that indicates that the image has been forged since in general artificial blurring results in greater gradient magnitudes than does optical blurring.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A process to assess integrity of a digital image comprising:
   detecting an edge in the digital image;
   defining a patch of pixels encompassing the edge;
   generating data relating to intensity and gradient magnitude for pixels in the patch;
   analyzing the data relating to intensity and gradient magnitude; and
   determining that the digital image has been forged or the digital image has not been forged based on the analysis of the data relating to intensity and gradient magnitude;
   wherein a forged image comprises an alteration of digital content of the digital image;
   wherein the generating data relating to intensity and gradient magnitude for the pixels in the patch comprises generating a scatter plot of the intensity versus the gradient magnitude for the pixels in the patch; and
   wherein the analyzing the data and the determining that the digital image has been forged or the digital image has not been forged comprises processing the data relating to pixel intensity and gradient magnitude via a machine learning model, and determining from output of the machine learning model that the digital image has been forged or the digital image has not been forged; and comprising training the machine learning model by:
   generating a two-dimensional histogram from the scatter plot, processing data from the two-dimensional histogram via a support vector machine (SVM), and determining from the SVM that the digital image has been forged or the digital image has not been forged;
   gathering a plurality of two-dimensional histograms;
   generating a first set of forged training data by accumulating data from the two-dimensional histograms wherein the two-dimensional histograms include a symmetric arch, and wherein a gradient magnitude from low intensity to middle intensity and a gradient magnitude from middle intensity to high intensity are substantially the same;
   generating a second set of authentic training data by accumulating data from the two-dimensional histograms wherein the two-dimensional histograms include a skewed asymmetric arch, and wherein the gradient magnitude from low intensity to middle intensity and the gradient magnitude from middle intensity to high intensity are not substantially the same; and training a forgery detection model using the first set of forged training data and the second set of authentic training data.

2. The process of claim 1, wherein the analyzing the data and the determining that the digital image has been forged or the digital image has not been forged comprises comparing the data to parametric models of optically blurred digital images, artificially blurred digital images, and artificially sharp digital images, and determining whether the digital image has been forged or has not been forged based on the comparing.

3. The process of claim 1, comprising generating a third set of forged training data by accumulating data from the two-dimensional histograms wherein the two dimensional histograms include an approximate right angle; and training the forgery detection model using the first set of forged training data, the second set of authentic training data, and the third set of forged training data.

4. The process of claim 1, comprising processing the data from the two-dimensional histogram via a convolutional neural network (CNN), and determining from the CNN that the digital image has been forged or the digital image has not been forged.

5. The process of claim 4, comprising:
gathering a plurality of two-dimensional histograms;
generating a first set of forged training data by accumulating data from the two-dimensional histograms wherein the two-dimensional histograms include a symmetric arch, and wherein a gradient magnitude from low intensity to middle intensity and a gradient magnitude from middle intensity to high intensity are substantially the same;
generating a second set of authentic training data by accumulating data from the two-dimensional histograms wherein the two-dimensional histograms include a skewed asymmetric arch, and wherein the gradient magnitude from low intensity to middle intensity and the gradient magnitude from middle intensity to high intensity are not substantially the same; and
training a forgery detection model using the first set of forged training data and the second set of authentic training data.

6. The process of claim 5, comprising generating a third set of forged data by accumulating data from the two-dimensional histograms wherein the two dimensional histograms include an approximate right angle; and training the forgery detection model using the first set of forged training data, the second set of authentic training data, and the third set of forged training data.

7. The process of claim 1, wherein the determining that the digital image has been forged or the digital image has not been forged comprises fusing the analysis for a plurality of patches, and determining whether the digital image has been forged or the digital image has not been forged based on the fusing.

8. The process of claim 1, comprising:
identifying a plurality of edges that are related;
generating a mask using the plurality of edges; and
identifying a location of a forged object in the digital image using the mask.

9. The process of claim 1, comprising training a forgery detection model by providing to the forgery detection model data relating to optically blurred edges from an authentic digital image, data relating to artificially blurred edges from a known forged image, and data relating to artificially sharp edges from a known forged image.

10. The process of claim 9, wherein the forgery detection model comprises one of more of a parametric fit operation, a support vector machine (SVM), and a convolutional neural network.

11. The process of claim 9, wherein the training comprises a multi-dimensional training scheme comprising comparing optically blurred edges to artificially blurred edges and artificially sharp edges, comparing artificially blurred edges to optically blurred edges and artificially sharp edges, and comparing artificially sharp edges to optically blurred edges and artificially blurred edges.

12. The process of claim 1, comprising processing the patch of pixels via a convolutional neural network (CNN), and determining from the CNN that the digital image has been forged or the digital image has not been forged.

13. The process of claim 1, comprising:
determining a first intensity on a first side of the edge;
determining a second intensity on a second side of the edge; and
predicting an amount of asymmetry expected in an authentic image based on the first intensity and the second intensity.

14. A system comprising:
a computer processor and a computer storage device configured for:
detecting an edge in the digital image;
defining a patch of pixels encompassing the edge;
generating data relating to intensity and gradient magnitude for pixels in the patch;
analyzing the data relating to intensity and gradient magnitude; and
determining that the digital image has been forged or the digital image has not been forged based on the analysis of the data relating to intensity and gradient magnitude;
wherein a forged image comprises an alteration of digital content of the digital image;
wherein the generating data relating to intensity and gradient magnitude for the pixels in the patch comprises generating a scatter plot of the intensity versus the gradient magnitude for the pixels in the patch; and
wherein the analyzing the data and the determining that the digital image has been forged or the digital image has not been forged comprises processing the data relating to pixel intensity and gradient magnitude via a machine learning model and determining from output of the machine learning model that the digital image has been forged or the digital image has not been forged; and comprising training the machine learning model by:
generating a two-dimensional histogram from the scatter plot, processing data from the two-dimensional histogram via a support vector machine (SVM), and determining from the SVM that the digital image has been forged or the digital image has not been forged;
gathering a plurality of two-dimensional histograms;
generating a first set of forged training data by accumulating data from the two-dimensional histograms wherein the two-dimensional histograms include a symmetric arch, and wherein a gradient magnitude from low intensity to middle intensity and a gradient magnitude from middle intensity to high intensity are substantially the same;
generating a second set of authentic training data by accumulating data from the two-dimensional histograms wherein the two-dimensional histograms include a skewed asymmetric arch, and wherein the gradient magnitude from low intensity to middle intensity and the gradient magnitude from middle intensity to high intensity are not substantially the same; and training a forgery detection model using the first set of forged training data and the second set of authentic training data.

15. A non-transitory computer readable medium comprising instructions that when executed by a processor execute a process comprising:

detecting an edge in the digital image;

defining a patch of pixels encompassing the edge;

generating data relating to intensity and gradient magnitude for pixels in the patch;

analyzing the data relating to intensity and gradient magnitude; and determining that the digital image has been forged or the digital image has not been forged based on the analysis of the data relating to intensity and gradient magnitude;

wherein a forged image comprises an alteration of digital content of the digital image;

wherein the generating data relating to intensity and gradient magnitude for the pixels in the patch comprises generating a scatter plot of the intensity versus the gradient magnitude for the pixels in the patch; and wherein the analyzing the data and the determining that the digital image has been forged or the digital image has not been forged comprises processing the data relating to pixel intensity and gradient magnitude via a machine learning model and determining from output of the machine learning model that the digital image has been forged or the digital image has not been forged; and comprising training the machine learning model by:

generating a two-dimensional histogram from the scatter plot, processing data from the two-dimensional histogram via a support vector machine (SVM), and determining from the SVM that the digital image has been forged or the digital image has not been forged;

gathering a plurality of two-dimensional histograms;

generating a first set of forged training data by accumulating data from the two-dimensional histograms wherein the two-dimensional histograms include a symmetric arch, and wherein a gradient magnitude from low intensity to middle intensity and a gradient magnitude from middle intensity to high intensity are substantially the same;

generating a second set of authentic training data by accumulating data from the two-dimensional histograms wherein the two-dimensional histograms include a skewed asymmetric arch, and wherein the gradient magnitude from low intensity to middle intensity and the gradient magnitude from middle intensity to high intensity are not substantially the same; and training a forgery detection model using the first set of forged training data and the second set of authentic training data.

* * * * *